DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 4

T887,002

REMOVAL OF ANTIOXIDANT FROM STYRENE-BUTADIENE COPOLYMER FILM WITH REDUCING FLAME

Leon Edward Wolinski, Buffalo, N.Y., assignor to E. I. du Pont de Nemours and Company, Wilmington, Del.

Filed Dec. 22, 1969, Ser. No. 887,304

Int. Cl. B29c *25/00*

U.S. Cl. 264—80

No Drawing. 3 Pages Specification

Process for the removal of antioxidant from the surface of styrene-butadiene copolymer film by exposing the surface, for a period of about from 0.01 to 0.05 seconds, to a reducing flame of a gaseous mixture consisting essentially of hydrocarbon fuel, oxygen and nitrogen. The reducing flame should have an oxygen ratio of about 2.78 and a fuel equivalence ratio of about from 1.05 to 1.25.